Patented Dec. 24, 1935

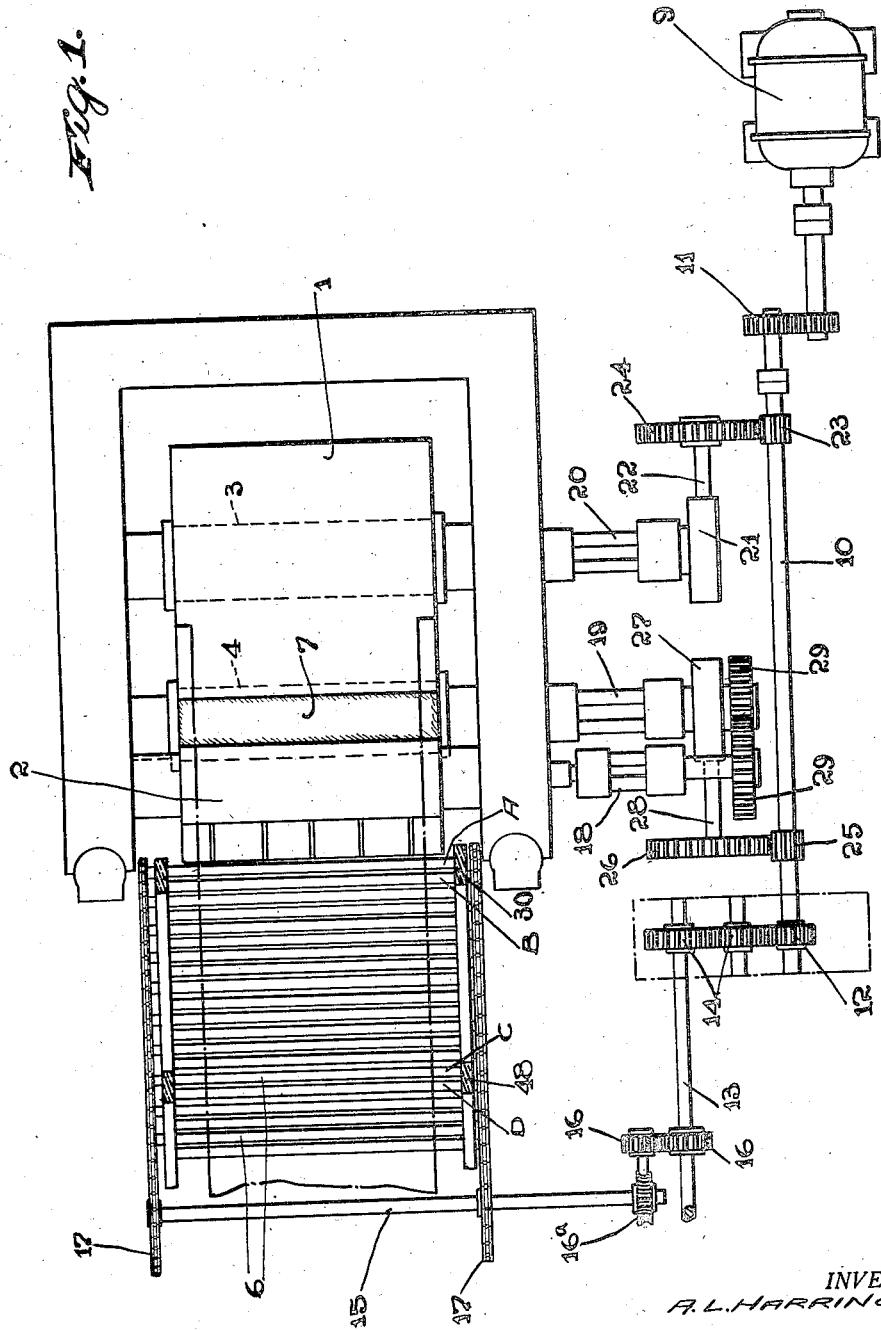

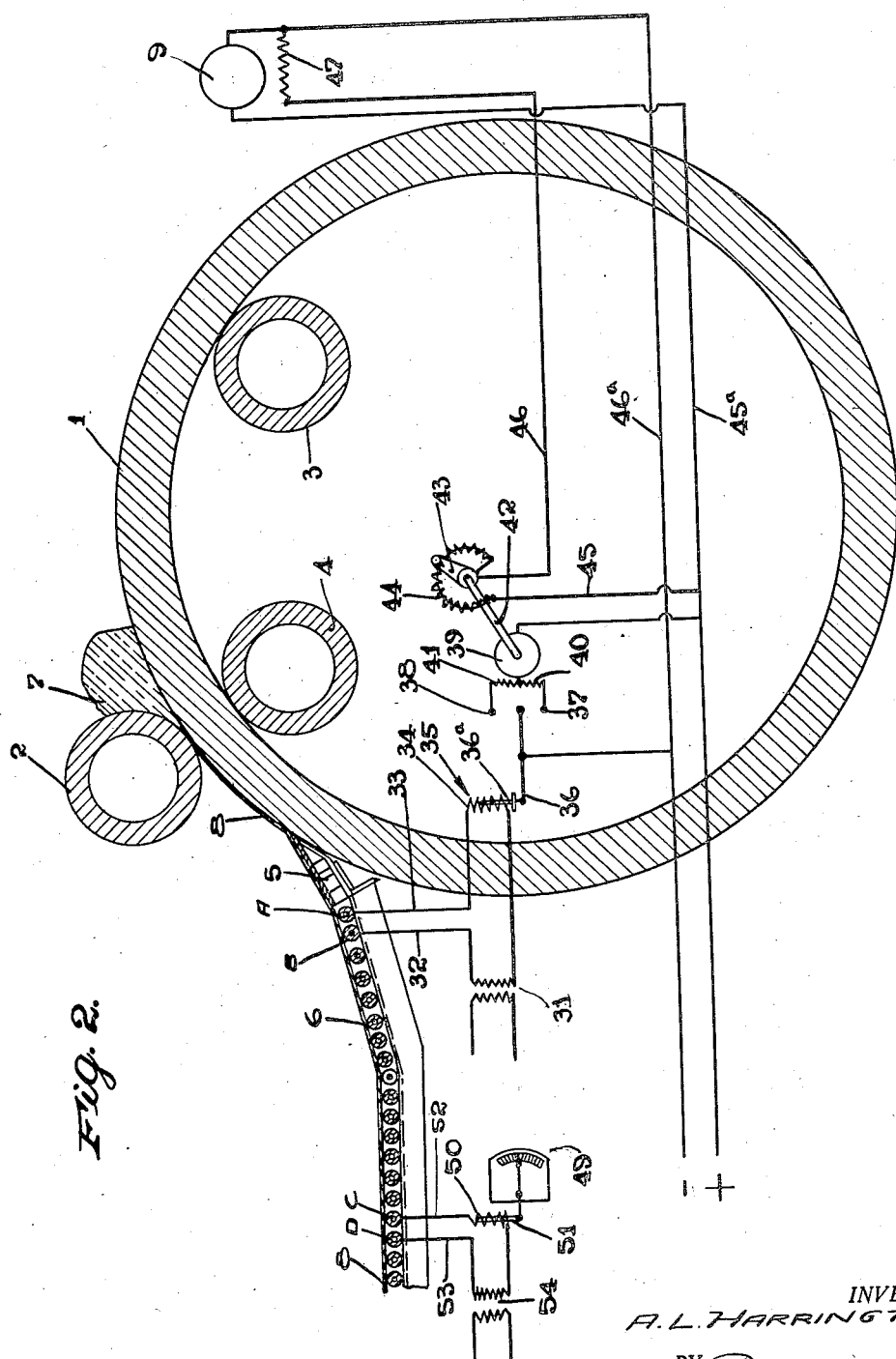

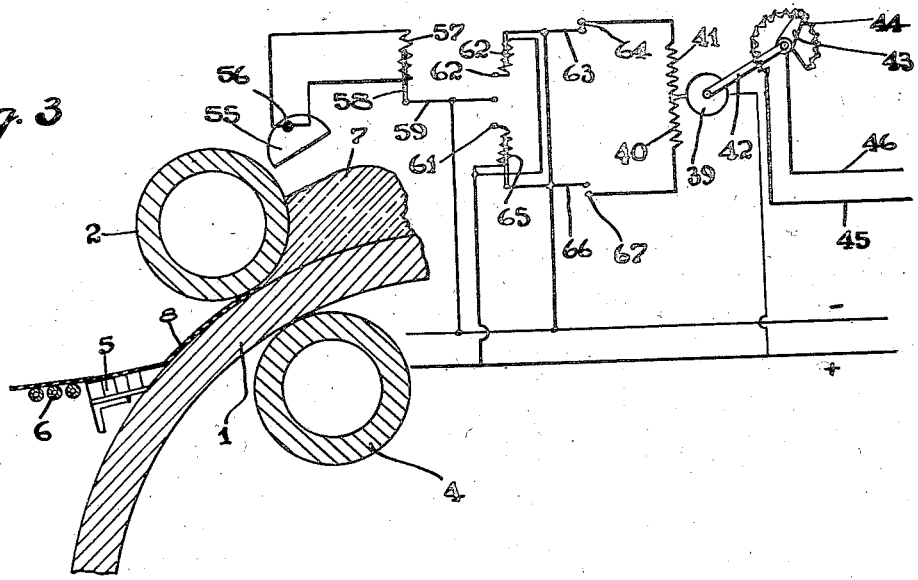
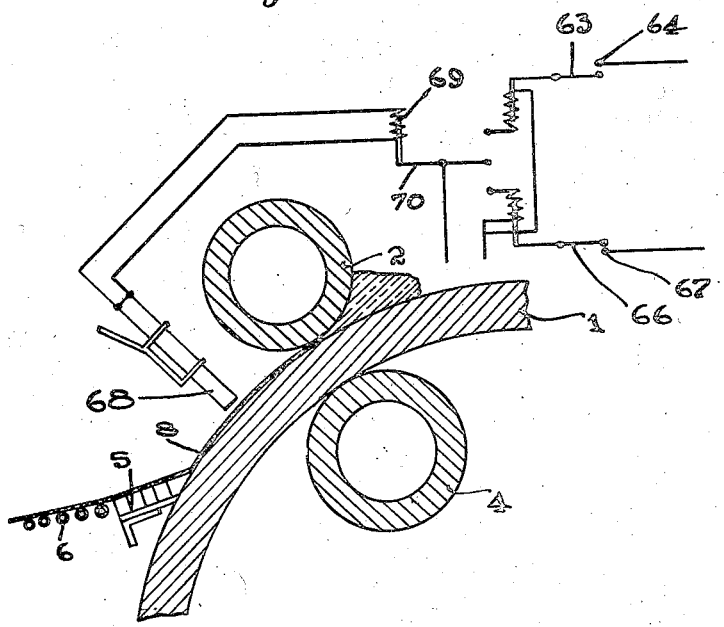

2,025,102

UNITED STATES PATENT OFFICE 2,025,102

GLASS ROLLING APPARATUS

Alfred L. Harrington, Rosslyn Farms, Pa., assignor to Pittsburgh Plate Glass Company, a corporation of Pennsylvania Application February 16, 1935, Serial No. 6,852

11 Claims. (Cl. 49—33)

The invention relates to an improvement in apparatus such as that shown in the Showers Patent No. 1,579,666, dated April 6, 1926. In the use of such apparatus, a body of molten glass is placed to the rear of a pair of sizing rolls and rolled out into a sheet which may range from 30 to 60 feet in length, the sheet thus formed being then carried on through a roller annealing leer. In an operation of this kind, the temperature of the glass sheet (for the major portion of its length) drops as the rolling of the sheet progresses, and the relatively low speed of rolling which suits the rolling of the first part of the sheet when the glass is most fluid is poorly adapted to rolling the last part of the sheet in which the glass is much cooler and stiffer. The present improvement has for its object the provision of means whereby the speed of rolling is adjusted automatically in accordance with the varying temperature and stiffness of the glass. This is accomplished by providing means responsive to temperature changes in the glass, so arranged that the speed of rotation of the driving means for the sizing rolls is increased as the temperature of the glass drops. As later explained, this may be accomplished by means (such as thermocouples) which are directly responsive to changes of temperature in the glass or by means which are indirectly responsive to changes of temperature in the glass and which depend on the conductivity of the glass, since the conductivity of the glass varies in accordance with changes in its temperature. When controlling means are employed which are directly responsive to temperature changes in the glass, such means may be applied either in opposition to the glass sheet which is being formed or in opposition to the body of glass behind the sizing rolls. Certain embodiments of the invention are illustrated in the accompanying drawings, wherein:

Figure 1 is a plan view of the apparatus. Fig. 2 is a vertical section and also includes a diagrammatic showing of the electrical control apparatus employed. Fig. 3 is a sectional view illustrating a modified form of electrical control apparatus. And Fig. 4 is a section showing another modification involving a departure from the thermocouple control of the Fig. 3 type of apparatus.

Referring to Figs. 1 and 2, the rolling apparatus comprises a pair of sizing rolls 1 and 2, the roll 1 being in the form of a ring, as in the Showers patent heretofore referred to, and being supported upon a pair of internal driven rollers 3 and 4 which cause the rotation of the ring roll. Forward of the ring roll in position to receive the glass sheet formed between the rolls is a runway consisting of the plate 5 and a series of rolls 6 suitably driven as hereinafter described and leading into a roller leer. In operation a body of glass from a pot is teemed into the pocket between the rolls 1 and 2, as indicated at 7, and this body of glass is rolled out into the sheet 8 which passes over the runway and into the roller leer.

The driving mechanism for the apparatus will be seen by reference to Fig. 1. This drive includes the variable speed motor 9 which drives the shaft 10 through the intermediary of the gears 11. The shaft 10 is provided at its end with a spur gear 12 which drives the shaft 13 through the intermediary of the spur gears 14. The shaft 13 is extended along the side of the roller leer (which is not shown) and serves to drive the leer rolls through suitable reduction gearing, which is well known in the art. The transverse shaft 15 is also driven from the shaft 13 through the spur gears 16 and the worm reduction 16a. The shaft 15 is provided with sprockets which drive chains 17 extending around sprocket wheels on the ends of the apron rolls. The ends of the rolls 2, 3, and 4 are provided with tumbler shafts 18, 19 and 20. These shafts are also driven from the shaft 10 by means of suitable reduction gearing. The shaft 20 is driven by worm gear mechanism in the casing 21 and the worm of this gear mechanism is carried by a shaft 22 driven from the shaft 10 through the spur gears 23, 24. The tumbler shaft 19 is similarly driven from the shaft 10 through the spur gears 25 and 26 and the worm gearing in the casing 27, the shaft 28 in this train of gearing corresponding to the shaft 22 which carries the worm in the casing 21. The tumbler shaft 18, which drives the sizing roll 2, is driven from the spur gears 29, one of which is carried by the end of the shaft of the worm wheel that drives the tumbler shaft 19. The foregoing gearing arrangement is one which is well known in the art so that a more detailed showing is unnecessary, the requirement here being that the sizing rolls 1 and 2 shall be driven at the same peripheral speed and that the peripheral speed of the apron rolls which carry away the glass sheet shall be the same as that of the sizing rolls.

The control of the driving speed of the motor 9, to which this invention particularly relates, is in this instance secured by variations in resistance to the passage of electric current in a section of the glass sheet passing over the rolls of the runway, which resistance is proportional to the temperature of the glass sheet, the principle being that as the sheet drops in temperature and the electrical resistance increases, the control mechanism shall cause the speeding up of the motor 9, or if this condition is reversed (due to the completion of one sheet and the beginning of another one) and the temperature of the glass sheet increases, the speed of the motor 9 will be slowed down. The section of the glass sheet, whose resistance serves as the control means, lies between the pair of apron rolls A and B, whose ends are mounted in insulated bearings 30, and have insulated sprockets so that when current is applied to the two rolls, the flow therebetween will pass through the section of the glass sheet above the rolls. Current is supplied to the rolls of suitable voltage from the transformer 31 (Fig. 2), one of whose leads 32 is in electrical connection with the roll B, while the other lead 33 is in connection with the roll A. The current which flows through this circuit passes through the coil 34 of the relay 35, such relay being provided with a solenoid bar 36a whose position is controlled by the coil. The solenoid bar regulates the position of a pivoted contactor arm 36, whose end in one position is adapted to engage the contact 37, and in another position to engage the contact 38. When the current flowing through the circuit including the layer of glass increases beyond a certain point, the relay arm moves up and makes contact with the member 38, while on the other hand, when the current drops below a certain amount, the contacter arm moves down and engages the member 37. When no current flows through the circuit, the relay arm is brought to the neutral position shown by spring means, not shown, but common to commercial relays of this type.

The above movement of the contactor arm 36 regulates the direction of rotation of the motor 39, which has a split field consisting of the sections 40 and 41. When the contactor arm 36 is in its upper position, current flows through the section 41 of the field and the motor turns in one direction, and when the arm 36 is in its lower position, current flows through the motor field section 40, and the motor 39 rotates in the reverse direction. The shaft 42 of the reversing motor carries a rheostat arm 43 which moves over the resistance 44, and this resistance 44 lies in a circuit including the line connections 45 and 46 (supplied from the leads 45a and 46a) and the field 47 of the variable speed motor 9. In the normal operation of the apparatus, the glass sheet becomes cooler as the rolling progresses (except at extreme tail end, where the temperature rises again), and through the control mechanism heretofore described, including the relay 35 and the reversing motor 39, the rheostat arm 43 is shifted so as to move the arm 43 in a clockwise direction, thus increasing the resistance in the circuit of the motor field 47 of the motor 9, so that such motor speeds up to correspond to the cooling of the glass sheet. On the other hand, when the rolling operation first starts and the glass is very hot and fluid, the resistance of the section between the rolls A and B is relatively low, and under these conditions the relay 35 and reversing motor 39 are operated to swing the arm 43 of the rheostat in a counterclockwise direction, thus decreasing the resistance in the circuit of the motor field 47, so that the motor slows down. Between operations, the circuit through the coil 34 is interrupted and the arm 36 of the relay 35 occupies the neutral position shown. At this time, the motor 9 and apparatus driven should be brought to the relatively low speed desirable between casting operations, and this may be accomplished by rotating the rheostat arm 43 in a counter clockwise direction, either by hand or by suitable automatic means, in order to increase the current flow through the field 47.

In order to form a check upon the temperatures existing in the rolls, a second pair of apron rolls C and D are preferably mounted in insulating bearings 48, and have insulated sprockets and the resistance to the flow of current in the section of the glass sheet lying above these rolls is indicated by means of an ammeter 49 having the coil 50 and the solenoid bar 51 operated thereby. This coil 50 lies in a circuit including the wires 52 and 53, to which current is supplied from the transformer 54. This instrument may be of the recording type, if desired. In case an automatic control of the motor 9 is not desired, the instrument 49 may be used by the operator as a guide in regulating the speed of the motor 9 by means of a hand rheostat lying in the circuit of the field 47.

The foregoing arrangement involves an indirect regulation of the speed of the motor 9 from the temperature conditions existing in the glass. This same result may be accomplished by the use of thermocouples without the necessity of applying means for passing a current of electricity through the glass. Fig. 3 illustrates diagrammatically how this may be accomplished using the varying temperature of the mass of molten glass 7 to operate the regulating means. In this construction a parabolic reflector 55 is employed, positioned as shown, and provided with a thermocouple 56. The flow of current from the leads of the thermo-couple passes through a relay coil 57, so that the bar 58 of the solenoid is moved up and down, depending upon temperature conditions in the body of molten glass, and the arm 59 is moved so that it engages either the contact 61 or the contact 62. When the contact 61 is engaged, a relay coil 62 is energized, thus operating another relay arm 63 so that it engages a contact member 64. Similarly when the arm 59 is brought into contact with the member 61, the coil 65 is energized and the relay arm 66 is caused to engage the contact member 67. From this point on the control is the same as heretofore described in the constructions of Figs. 1 and 2, the operation of the arms 63 and 66 controlling the current flow through the sections of the split field reversing motor 39, which operates the rheostat arm 43 for controlling the current flow through the field of the motor 9. The relays employed in this apparatus are of the same type as the relay 36, heretofore described, their arms being brought to neutral position by spring means in the absence of current flow through their coils.

Fig. 4 illustrates a further modification in which the control of the speed of the motor is regulated from a thermo-couple working upon the same principle as the apparatus of Fig. 3. The only difference in this construction, as compared with that of Fig. 3, is that the tube 68 carrying the thermo-couple is located so that such thermo-couple is in front of the roll 2 and closely adjacent to the glass sheet. The temperature control thus comes from the sheet instead of from the mass of glass back of the rolls as is the case in the Fig. 3 construction. The leads of the thermo-couple members are connected to the relay coil 69 which operates a relay arm 70 corresponding to the arm 59 of the Fig. 3 construction. From this point on the control is the same as heretofore described in connection with Fig. 3.

The invention is particularly applicable in making colored structural glass, such as ivory, jade and the like, in which the color obtained is partly dependent upon the temperature of the sheet on the apron rolls. If there is a wide variation in temperature in the sheet, it will exhibit varying shades of color, and by the application of the present invention, this difficulty is avoided.

What I claim is:

1. In combination with glass sizing rolls for forming a glass sheet and a motor drive therefor, control means responsive to temperature changes in the glass, and means operated by said control means for regulating the speed of the motor drive.

2. In combination with glass sizing rolls for forming a glass sheet and a motor drive therefor, control means responsive to changes in the electrical conductivity of the glass sheet incident to temperature changes therein, and means operated by said control means for regulating the speed of the motor drive.

3. In combination with glass sizing rolls for forming a glass sheet and an electric motor drive for the rolls, control means responsive to temperature changes in the glass, and means operated by said control means for regulating the speed of the motor drive, said means for regulating the speed of the motor drive including a rheostat for varying the current flow through the motor field, a reversing motor for governing the rheostat and a relay governed by said temperature changes for controlling the direction of rotation of such last motor.

4. In combination with glass sizing rolls for forming a glass sheet and a motor drive therefor, control means responsive to temperature changes in the glass sheet, and means operated by said control means for regulating the speed of the motor drive.

5. In combination with glass sizing rolls for forming a glass sheet and a motor drive therefor, control means responsive to temperature changes in the body of molten glass back of the rolls, and means operated by said control means for regulating the speed of the motor drive.

6. In combination with glass sizing rolls for forming a glass sheet and a motor drive therefor, control means responsive to temperature changes in the glass, and means operated by said control means for regulating the speed of the motor drive, said control means including a thermo-couple adjacent to the glass.

7. In combination with glass sizing rolls for forming a glass sheet and a motor drive therefor, control means responsive to temperature changes in the body of molten glass back to the rolls, and means operated by said control means for regulating the speed of the motor drive, said control means including a thermo-couple located in proximity to the body of glass.

8. In combination with glass sizing rolls for forming a glass sheet and a motor drive therefor, control means responsive to temperature changes in the glass sheet, and means operated by said control means for regulating the speed of the motor drive, said control means including a thermo-couple located in proximity to the pass between the rolls.

9. In combination with glass sizing rolls for forming a glass sheet and a motor drive therefor, control means responsive to changes in the electrical conductivity of the glass sheet incident to temperature changes therein, and means operated by said control means for regulating the speed of the motor drive, said means for regulating the speed of the motor drive including a rheostat for varying the current flow through the motor field, a reversing motor for the rheostat and a relay governed by said changes in the electrical conductivity of the glass sheet for controlling the direction of rotation of such last motor.

10. In combination with glass sizing rolls for forming a glass sheet, a roller runway in advance of the sizing rolls for receiving the glass sheet and an electric motor drive for the rolls, means for insulating two successive rolls of the roller runway, means for causing a flow of electric current through the portion of the glass sheet between said successive rolls, control means responsive to such flow of current, and means operated by said control means for regulating the speed of the motor drive.

11. In combination with glass sizing rolls for forming a glass sheet, a roller runway in advance of the sizing rolls for receiving the glass sheet and an electric motor drive for the rolls, means for insulating two successive rolls of the roller runway, means for causing a flow of electric current through the portion of the glass sheet between said successive rolls, a relay responsive to said flow of current, a reversing motor whose direction of rotation is governed by the relay, and a rheostat operated by the reversing motor and regulating the flow of current through the field of the motor which drives the sizing rolls.

ALFRED L. HARRINGTON.